United States Patent [19]
Hoshino et al.

[11] Patent Number: 5,193,137
[45] Date of Patent: Mar. 9, 1993

[54] QUARTZ OPTICAL WAVEGUIDE AND METHOD FOR PRODUCING THE SAME

[75] Inventors: Sumio Hoshino; Hiroo Kanamori; Masumi Ito; Shinji Ishikawa; Haruhiko Aikawa, all of Yokohama, Japan

[73] Assignee: Sumitomo Electric Industries, Ltd., Osaka, Japan

[21] Appl. No.: 765,243

[22] Filed: Sep. 25, 1991

[30] Foreign Application Priority Data

Sep. 25, 1990 [JP] Japan .................................. 2-251881

[51] Int. Cl.$^5$ ........................... G02B 6/10; G02B 6/26
[52] U.S. Cl. .................................................... 385/129
[58] Field of Search ............................... 385/129–132; 372/6

[56] References Cited

U.S. PATENT DOCUMENTS

| | | | |
|---|---|---|---|
| 4,535,141 | 8/1985 | Kroupa | 385/129 |
| 4,856,859 | 8/1989 | Imoto | 385/129 |
| 5,007,698 | 4/1991 | Sasaki et al. | 385/123 |
| 5,027,079 | 6/1991 | Desurvire et al. | 372/6 X |
| 5,067,134 | 11/1991 | Oomen | 372/6 |

*Primary Examiner*—Akm E. Ullah
*Attorney, Agent, or Firm*—Cushman, Darby & Cushman

[57] ABSTRACT

A quartz optical waveguide comprising a support, a quartz glass core part formed on said support and a part which surrounds said core part and has a lower refractive index than that of said core part, wherein said core part and/or a part of said lower refractive index part through which light is guided have a functional material waveguide film containing a functional material, which has a function such as laser amplification or a linear optical effect.

6 Claims, 3 Drawing Sheets

FIG. IA
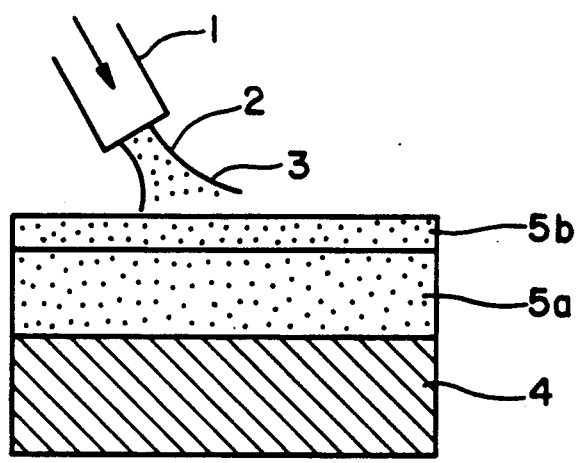
FIG. IB
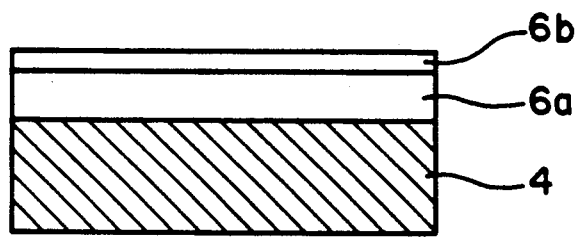
FIG. IC
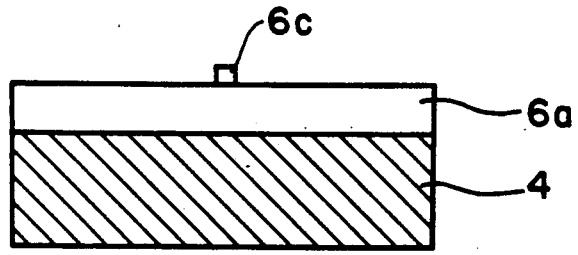
FIG. ID
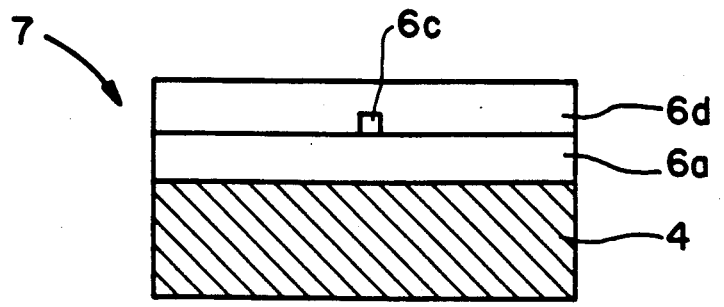

QUARTZ OPTICAL WAVEGUIDE AND METHOD FOR PRODUCING THE SAME

BACKGROUND OF THE INVENTION

1. Field of the Invention

The present invention relates to a quartz optical waveguide which has a function such as laser amplification or a nonlinear optical effect and a method for producing such functional quartz optical waveguide.

2. Description of the Related Art

Among optical waveguides, a quartz optical waveguide comprising quartz glass attracts attentions since it has a low light transmission loss and can be connected with a quartz optical fiber with a low connection loss.

In general, such quartz optical waveguide is produced by a combined method of glass film formation by a flame hydrolysis deposition (FHD) and fine processing of the formed glass film by reactive ion etching (RIE) (cf. Masao Kawachi, "Quartz Optical Waveguides and Their Application in Integrated Optical Elements", OPTICS, 18 (12), December 1989, 681–686).

The above method for producing a quartz optical waveguide will be explained by making reference to FIG. 1.

As shown in FIG. 1A, a glass-forming raw material such as $SiCl_4$, $TiCl_4$ and the like are supplied to a burner 1 together with a fuel gas (e.g. hydrogen gas, oxygen gas, etc.) and hydrolyzed and oxidized in an oxyhydrogen flame 2 to form fine particles 3 (soot) of glass. The glass soot is then deposited on a support 4 such as a silicon wafer to successively form films of glass soot 5a and 5b which have different compositions from each other. The deposited glass films on the support 4 are vitrified by heating them at a high temperature to obtain a buffering layer 6a and a core layer 6b as shown in FIG. 1B.

The above method is FHD.

Then, by RIE, unnecessary parts of the core layer 6b are removed to remain a ridge-form core part 6c as shown in FIG. 1C. Again, by FHD, a cladding layer 6d is formed to surround the core part 6c to form an embedded type quartz optical waveguide 7 as shown in FIG. 1D.

Since the above described FHD makes it possible to produce a quartz film having a low light transmission loss at a high film forming rate, it is most widely used in the production of the quartz optical waveguide. However, most of the optical waveguides produced by this method are used as passive type optical elements such as an element for merging and dividing light or an element for branching.

Then, it is highly desired to provide a functional optical waveguide which has a function such as laser amplification or a switching function using a nonlinear optical effect.

To realize such function, it is necessary to add a rare earth element which has a laser generating function or semiconductor fine particles which have a nonlinear optical effect to the optical waveguide. However, it is difficult to synthesize a glass containing the rare earth element or the semiconductor material which is unstable at high temperature, since FHD synthesizes the glass in an oxyhydrogen flame having a temperature of 2000° C. or higher.

SUMMARY OF THE INVENTION

One object of the present invention is to provide a functional quartz optical waveguide which has a laser amplification property or a nonlinear optical effect.

Another object of the present invention is to provide a method for producing a functional quartz optical waveguide.

According to a first aspect of the present invention, there is provided a quartz optical waveguide comprising a support, a quartz glass core part formed on said support and a part which surrounds said core part and has a lower refractive index than that of said core part, wherein said core part and/or a part of said lower refractive index part through which light is guided have a functional material waveguide film containing a functional material.

According to a second aspect of the present invention, there is provided a method for producing a functional quartz optical waveguide comprising a support, a core part and a part which surrounds said core part and has a lower refractive index than that of said core part, which method comprises steps of depositing fine particles (soot) of a glass by a flame hydrolysis deposition on a support and heating said deposited glass soot to form a transparent glass layer, wherein, at said core part and/or a part of said lower refractive index part, a glass optical waveguide film containing a functional material is formed by a sol-gel method.

BRIEF DESCRIPTION OF THE DRAWINGS

FIGS. 1(A)–(D) schematically shows the steps of the flame hydrolysis deposition method for producing a quartz optical waveguide, and FIGS. 2A–F and 3A–F schematically show steps of the production of the optical waveguide according to the present invention.

DETAILED DESCRIPTION OF THE DRAWINGS

In the present invention, the functional optical waveguide intends to mean an optical waveguide which has a function other than waveguiding such as laser amplification and a nonlinear optical effect. For example, the functional optical waveguide includes a quartz optical waveguide which contains a rare earth element having a laser amplification effect (e.g. Er, Nd, etc.) or fine particles of a semiconductor having a nonlinear optical effect (e.g. $CdS_xSe_{1-x}$, PbS, CuCl, etc.).

According to the present invention, the core part or the lower refractive index part through which light passes has such functional waveguide film, whereby the production of the functional optical waveguide is simplified.

Since the functional waveguide film cannot be produced by FHD which utilized the oxyhydrogen flame having a temperature of 2000° C. or higher to synthesize the glass, it is preferably produced by one of other methods for producing a glass thin film such as a sol-gel method or spattering. That is, the functional waveguide film is produced by such other method, while the remaining parts of the optical waveguide of the present invention are produced by FHD which can produce the glass containing very few impurities at a high production rate.

The sol-gel method is well known in the art and generally comprises hydrolyzing and polymerizing a silicon alkoxide (e.g. $Si(OCH_3)_4$, $Si(OC_2H_5)_4$, $Si(OC_3H_7)_4$, etc.) in an alcohol (e.g. methanol, ethanol, propanol, etc.) with removal of water to obtain a sol solution, coating the sol solution on a support and heating and drying it at a temperature of, for example, from 500° to 1000° C. to form a glass thin film. Since the glass is not exposed to a high temperature in the sol-gel method, the functional material is easily added to the synthesized glass. In addition, since the functional material is simply added to the sol solution, it is uniformly added to the synthesized glass in a high concentration.

When the functional waveguide film is formed in a part of the core part or the lower refractive index part, it is formed selectively at a desired part by a photoresist method comprising forming a photoresist film having a waveguide pattern on the support or a reactive etching comprising chemically removing undesired parts of the glass.

In the present invention, a silicon wafer or a quartz glass may be used as a support.

PREFERRED EMBODIMENTS OF THE INVENTION

The present invention will be illustrated by following Examples.

EXAMPLE 1

Figure 2A:
Figure 2B:
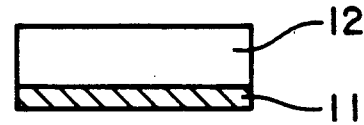
Figure 2C:
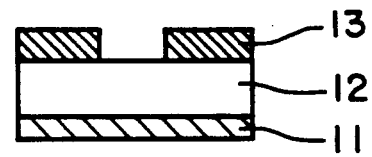
Figure 2D:
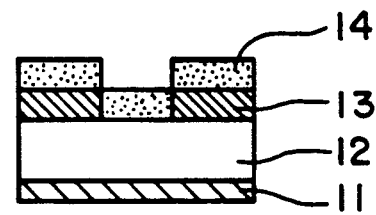
Figure 2E:
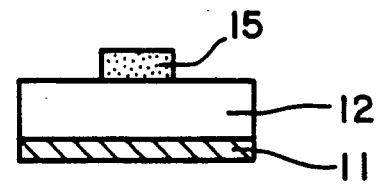
Figure 2F:
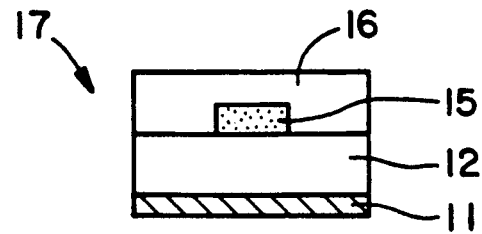

FIG. 2 shows steps of one embodiment of the method for producing a functional quartz optical waveguide according to the present invention.

As shown in FIG. 2, a silicon wafer 11 was provided (Step (a)). On the wafer 11, a buffering layer 12 made of a $SiO_2$—$P_2O_5$—$B_2O_3$ glass film having a thickness of 20 $\mu$m was formed by FHD, namely supplying $SiCl_4$ together with $POCl_3$ and $BCl_3$ in an oxyhydrogen flame to form a glass soot film on the wafer and heating the soot glass film at 1250° C. in a helium atmosphere containing 10% of oxygen for 2 hours to vitrify the glass film (Step (b)).

A resist film 13 was formed on parts on which a core part would not be formed by a photoresist method, namely forming a film of a resist having a thickness of 8 $\mu$m by spin coating on the buffering layer 12, placing a photomask having a waveguide pattern on the resist film, irradiating UV light, dipping in a removing liquid to remove the resist film on the core part (Step (c)).

Then, was formed an Er-doped glass film 14 which had a thickness of 8 $\mu$m and contained 3% by weight of Er and $GeO_2$ in a concentration corresponding to 0.34% increase of the refractive index from pure quartz by the sol-gel method, namely applying a sol prepared by hydrolysis of a solution of silicon ethoxide, titanium isopropoxide, ethanol and hydrochloric acid containing erbium chloride by spin coating and heating it in air at 300° C. for 1 (one) hour (Step (d)). Thereafter, the resist film 13 was removed by dipping the wafer in a removing liquid to from a core part 15 consisting of the Er-doped glass film which was produced by the sol-gel method (Step (e)). Finally, to surround the core part 15, a cladding part 16 made of a quartz glass film having a thickness of 40 $\mu$m was formed by FHD under the same conditions as above to obtain a functional optical waveguide 17.

Since the core part 15 of the produced optical waveguide 17 is made of the Er-doped glass, it has a laser generating function. For example, when a signal light having a wavelength of 1.55 $\mu$m is introduced in the optical waveguide 17 together with an amplification laser beam having a wavelength of 1.47 to 1.49 $\mu$m, the signal light having the wavelength of 1.55 $\mu$m is amplified.

Since the Er-doped glass film is formed by the sol-gel method, the waveguide has a larger amplification effect than a glass film containing the same concentration of Er which is made by FHD alone.

EXAMPLE 2

Figure 3A:
Figure 3B:
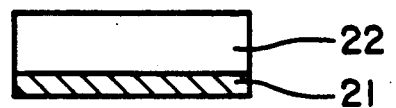
Figure 3C:
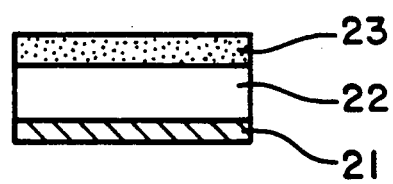
Figure 3D:
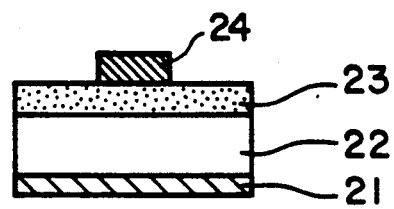
Figure 3E:
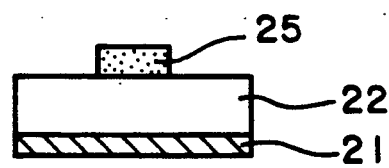
Figure 3F:
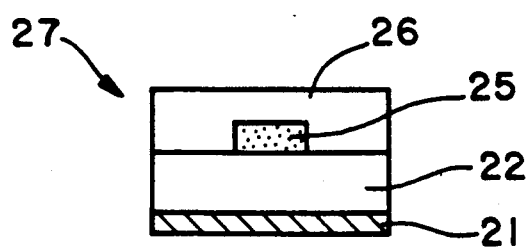

FIG. 3 shows steps of another embodiment of the method for producing a functional quartz optical waveguide according to the present invention.

As shown in FIG. 3, a silicon wafer 21 was provided (Step (a)). On the wafer 21, a buffering layer 22 made of a quartz glass film having a thickness of 20 $\mu$m was formed by FHD (Step (b)). On the buffering layer 22, a CdS-doped glass film 23 which had a thickness of 8 $\mu$m and contained 1% by weight of CdS as semiconductor fine particles and $GeO_2$ in a concentration corresponding to 0.34% increase of the refractive index of quarts was formed by the sol-gel method (Step (c)). A resist film 24 was formed on only a part corresponding to a core part by a photoresist method (Step (d)). Then, unnecessary parts of the glass film 23 was removed by RIE using $C_2F_6$ as an etchant gas to remain the core part 25 (Step (e)). Finally, to surround the core part 25, a cladding part 26 made of a quartz glass film having a thickness of 40 $\mu$m was formed by FHD to obtain a functional optical waveguide 27.

Since the functional optical waveguide 27 has the core part 25 made of the CdS-doped glass film, it has a nonlinear optical effect and can be used as a switching element.

Though, in Examples 1 and 2, the functional material was doped in the core parts 15 and 25, the functional optical waveguide of the present invention can be produced by selectively doping the lowermost or uppermost layer of the core parts 15 and 325, or the uppermost layer of the buffering layers 12 and 22 below the corresponding core parts 15 and 25 or the lowermost layer of the cladding layers 16 and 26 over the core parts 15 and 25.

What is claimed is:

1. A quartz optical waveguide comprising:
   a support;
   a first quartz glass layer formed on said support;
   a quartz glass core containing a functional material formed on said first quartz glass layer; and
   a second quartz glass layer formed on said first quartz glass layer and said quartz glass core, said first and second quartz glass layers having a lower refractive index than that of said quartz glass core, said quartz glass core being surrounded by said first and second quartz glass layers.

2. The quartz optical waveguide according to claim 1, wherein said functional material is a rare earth element having a laser amplification effect.

3. The quartz optical waveguide according to claim 2, wherein said rare earth metal is at least one selected from the group consisting of Er and Nd.

4. The quartz optical waveguide according to claim 1, wherein said functional material is a semiconductor having a nonlinear optical effect.

5. The quartz optical waveguide according to claim 4, wherein said semiconductor is at least one selected from the group consisting of $CdS_xSe_{1-x}$, PbS and CuCl.

6. A method for producing a functional quartz optical waveguide comprising a support and a quartz glass core surrounded by a quartz glass cladding having a lower refractive index than that of said quartz glass core, the method comprising the steps of:

depositing fine particles of glass soot by a flame hydrolysis deposition on a support;

heating said deposited glass soot to form a first transparent glass layer;

forming a quartz glass core containing a functional material by a sol-gel method on said first transparent glass layer;

depositing second fine particles of glass soot by a flame hydrolysis deposition on said quartz glass core and said first transparent glass layer; and heating said second deposited glass soot to form a second transparent layer of glass, whereby said quartz glass core is surrounded by transparent glass.

* * * * *